US007193775B2

United States Patent
Olszak et al.

(10) Patent No.: US 7,193,775 B2
(45) Date of Patent: Mar. 20, 2007

(54) EPI-ILLUMINATION SYSTEM FOR AN ARRAY MICROSCOPE

(75) Inventors: Artur G. Olszak, Tucson, AZ (US); Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 0 days.

(21) Appl. No.: 10/158,626

(22) Filed: May 30, 2002

(65) Prior Publication Data

US 2003/0223107 A1    Dec. 4, 2003

(51) Int. Cl.
*G02B 21/06*    (2006.01)
(52) U.S. Cl. .................. 359/389; 359/385; 359/900
(58) Field of Classification Search ........ 359/385–390; 250/208.1
See application file for complete search history.

(56) References Cited

U.S. PATENT DOCUMENTS

| | | | |
|---|---|---|---|
| 4,168,900 A | 9/1979 | Adachi | 355/1 |
| 4,448,499 A | 5/1984 | Tokumaru | |
| 4,884,881 A * | 12/1989 | Lichtman et al. | 359/227 |
| 5,163,117 A | 11/1992 | Imanashi et al. | 385/120 |
| 6,133,986 A | 10/2000 | Johnson | 355/67 |
| 6,343,162 B1 | 1/2002 | Saito et al. | 382/312 |
| 6,392,752 B1 | 5/2002 | Johnson | |
| 6,639,201 B2 * | 10/2003 | Almogy et al. | 250/208.1 |

FOREIGN PATENT DOCUMENTS

EP    0911667 A1    4/1999
WO   WO 01/23913    4/2001

* cited by examiner

*Primary Examiner*—James Phan
(74) *Attorney, Agent, or Firm*—Birdwell & Janke, LLP

(57) ABSTRACT

An epi-illumination system for an array microscope. For Kohler illumination, illumination light sources are placed, actually or virtually, at the pupils of respective individual microscope elements of an array microscope. In one Kohler illumination embodiment, the light source is a point source comprising the tip of an optical fiber placed on the optical axis at the pupil of its corresponding microscope element. In another Kohler illumination embodiment, the illumination light is provided by a reflective boundary placed on the optical axis of a corresponding microscope element. For critical illumination the light sources are placed at locations conjugate with their respective object planes so as to image the light sources thereon. For dark-field illumination, the support material around a microscope element lens, which is used to support an array of lenses, is fashioned to form an illumination optical element so that light from an off-axis source is directed by the illumination element toward the object plane at an angle such that light will not be reflected into the field of view of the imaging system, but scattered or fluorescence light will be within that field of view. The illumination optical element may be refractive element, a Fresnel element, a reflective element, a diffractive element, or some combination of one or more of these elements. An array of pinhole apertures may be provided to operate the array microscope in a confocal mode. All of the embodiments may be used for epi-fluorescence microscopy.

9 Claims, 18 Drawing Sheets

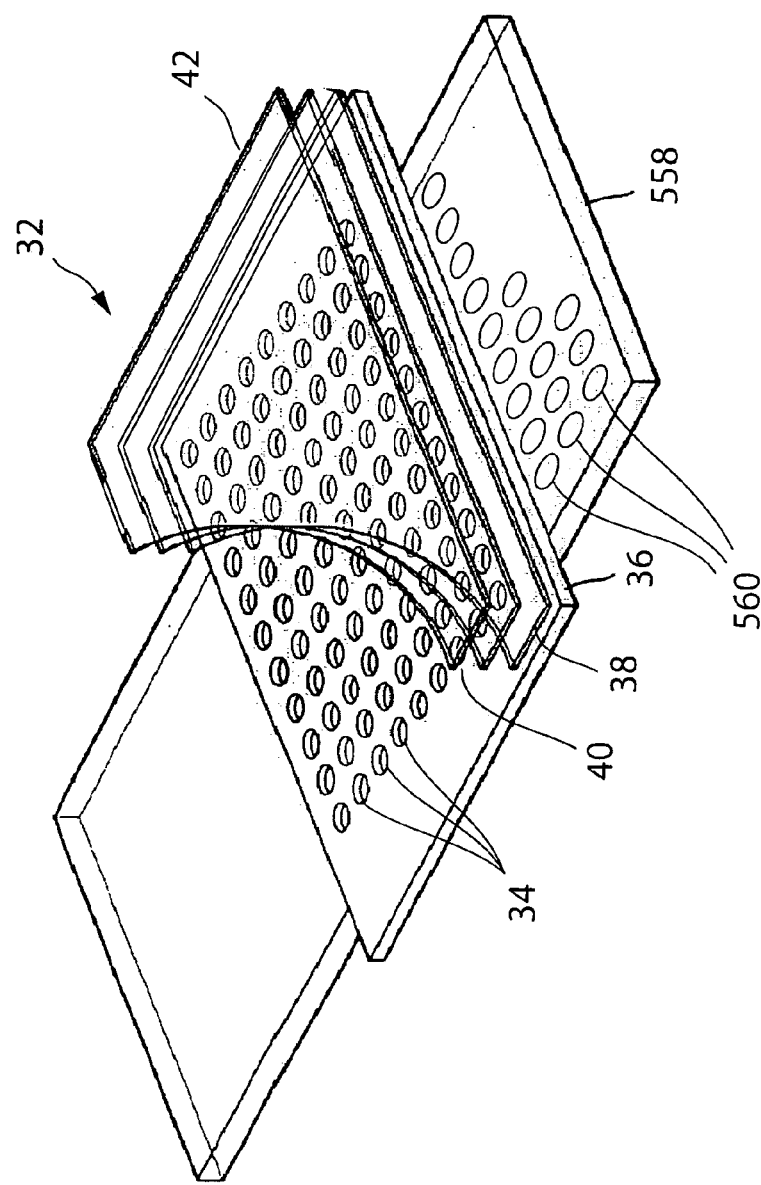

EPI-ILLUMINATION SYSTEM FOR AN ARRAY MICROSCOPE

FIELD OF THE INVENTION

This invention relates to microscopy, and particularly to illumination systems for an array microscope comprising a plurality of optical imaging elements configured to image respective sections of an object and disposed with respect to an object plane so as to produce at respective image planes respective images of the respective sections of the object.

BACKGROUND OF THE INVENTION

In microscopy, adequate and appropriate illumination of the object to be imaged by a microscope is essential. There must be enough light provided to the object to permit a viewer or detector to discern features of the object in the image produced by the microscope. In addition, the manner in which the light is provided to the object makes a difference in what features can be detected and the contrast with which they are imaged. Fundamentally, if the object to be imaged is transparent, it can be illuminated so that light passes through it and is modulated by the features of the object. This type of illumination is known as dia-illumination, through illumination or trans-illumination. On the other hand, if the object is opaque, it must be illuminated so that the light used to form an image of the object is emitted from the same side of the object on which light illuminates the object. This type of illumination is known primarily as epi-illumination. In epi-illumination the light emission from an object may be in the form of reflection, in which case the illumination light is modulated upon reflection from the object, or it may be in the form of fluorescence, in which case the illumination light induces fluorescent emission by the object at a different wavelength from the illumination light, as determined by the fluorescence characteristics of the object. The latter case is known as epi-fluorescence.

Several different types of illumination may be used in epi-illumination microscopy. Perhaps most common is Kohler illumination, where a light source is imaged by an illumination lens, usually referred to as a condenser, into the pupil of an imaging lens, thereby providing uniform illumination of the object. The light source is ordinarily disposed actually or virtually on the optical axis of the imaging lens. This is typically accomplished by placing a beam splitter between the imaging lens and the image plane so as to change the direction of propagation of illumination light from lateral to axial, while permitting the image light to propagate axially to the image plane.

Another type of illumination that is sometimes used with epi-illumination microscopy is critical illumination. In this case, the light source is imaged at the object plane. This provides a shorter illumination system, but requires that the light source provide uniform radiance. Like Kohler illumination, the light source is ordinarily disposed actually or virtually on the optical axis of the imaging lens.

A third type of illumination that is often used with epi-illumination microscopy is dark-field, or "anti-specular," illumination. In this case, the illumination light is directed toward the object from a location sufficiently far off the optical axis of the imaging lens that light that is specularly reflected from the object does not enter the entrance pupil of the imaging lens. In the absence of an object, no illumination light is collected by the imaging lens. In the presence of an object, light scattered by the object is collected and imaged by the imaging lens.

In the foregoing it is assumed that the entire field of view of the imaging lens is simultaneously imaged. However, in a confocal microscope only one point in object space is imaged. This is accomplished by placing a "pinhole" stop at the image plane of the microscope matched to a point source in the object plane and scanning the object laterally, either by moving the object or the microscope, or moving the scanning the beam through the microscope using, for example, scan mirrors. The light passed by the pinhole is detected and related to relative object position as the scan occurs and the output of the detector is used to produce an image of the object as a whole. In this case, light from the light source is focused to the point on the object plane that is currently imaged. This is typically accomplished by placing a beam splitter between the imaging lens and the image plane so as to pass image light to the image plane while reflecting source light from a virtual image plane created by the beam splitter along the optical axis of the microscope toward the object plane.

The recent development of array microscopes, also known as miniaturized microscope arrays, presents new challenges for illumination. In array microscopes a plurality of laterally-distributed optical imaging elements having respective longitudinal optical axes are configured to image respective sections of an object and disposed with respect to an object plane in front of the imaging elements so as to produce at respective image planes respective images of the respective sections of the object in back of the imaging elements. The individual lenses of this array are formed of small optical elements, or "lenslets," that place severe constraints on providing illumination. Indeed, the multiplicity of lenslets arranged in an array and the small dimensions of the array suggest that prior art epi-illumination techniques cannot be used. Yet, a principal application for array microscopes is to image specimens, such as biological microarrays for protein analysis that are sufficiently opaque that dia-illumination cannot be used effectively.

Accordingly, there is an unfulfilled need for methods and devices for providing epi-illumination of objects to be imaged by array microscopes using epi-illumination.

SUMMARY OF THE INVENTION

The present invention meets the challenge of providing epi-illumination in an array microscope by placing the light source, directly or virtually, at the pupil of individual microscope elements on the optical axis thereof where the light source has negligible affect on the image, or at the plan conjugate with the object, and by taking advantage of support material between imaging elements in an array thereof to provide illumination optical elements, thereby permitting standard illumination concepts to be applied in a novel way to accommodate an array microscope. For Kohler illumination, illumination light sources are placed at the pupils of respective individual microscope elements. In one Kohler illumination embodiment, the light source is a point source comprising the tip of an optical fiber placed on the optical axis at the pupil of its corresponding microscope element. In another Kohler illumination embodiment, the illumination light is provided by a reflective boundary in a light guide placed on the optical axis of a corresponding microscope element. For critical illumination the light sources are placed at locations conjugate with their respective object planes so as to image the light sources thereon. This configuration is particularly suitable for confocal microscopy. For dark-field illumination, the support material around a microscope lens, which is used to support an array of lenses, is fashioned to form an illumination optical element so that light from an off-axis source is directed by the illumination element toward the object plane at an angle such that light will no be reflected into the field of view of the imaging system but scattered or fluorescence light will be within that field of view. The illumination optical element may be a refractive element, a Fresnel lens, a reflective element, a diffractive element, or some combination of one or more of these elements. An array of pinhole apertures may be provided to operate the array microscope in a confocal mode. All of the embodiments may be used for epi-fluorescence microscopy.

Accordingly, it is principal objective of the present invention to provide novel systems and methods for illumination in array microscopes.

The foregoing and other objectives, features, and advantages of the invention will be more readily understood upon consideration of the following detailed description of the invention, taken in conjunction with the accompanying drawings

BRIEF DESCRIPTION OF THE DRAWINGS

FIG. 18 is a perspective view of an array microscope used for epi-fluorescence microscopy of biological microarrays.

DETAILED DESCRIPTION OF THE INVENTION

The illumination systems and methods of the present invention are adapted for use with array microscopes. Such array microscopes, which are a recent development, may be used, for example, to scan and image entire tissue samples for use by pathologists. Other object types such as metallurgical samples and microarrays for bio-assays are opaque; consequently, epi-illumination must be used, rather than dia-illumination. Individual microscope elements of array microscopes are closely packed and have a high numerical aperture. This enables the capture of a high-resolution microscopic image of the entire sample in a short period of time by scanning the specimen with the array. It also presents novel illumination challenges which are met by the present invention.

1. Array Microscopes

Figure 1:
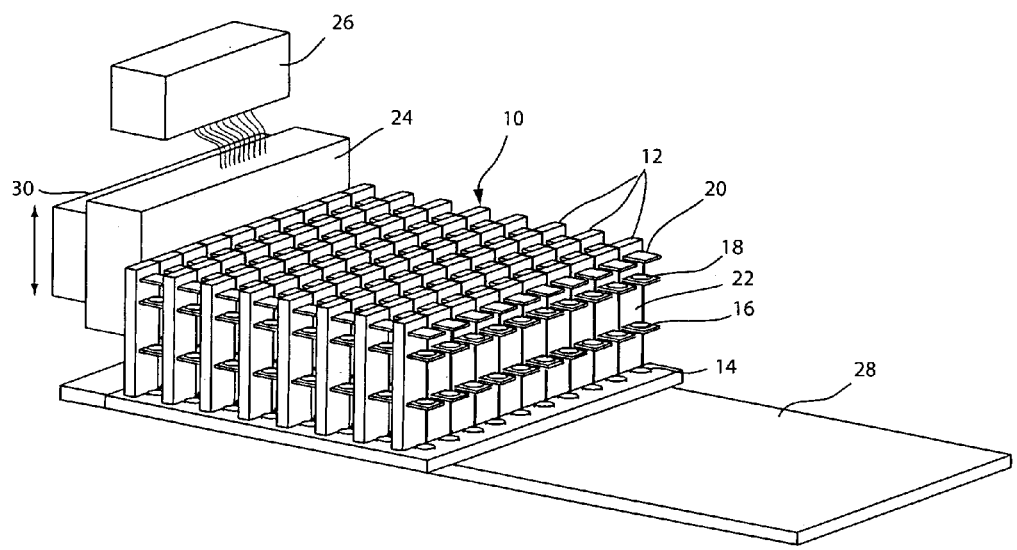
FIG. 1 is a perspective view of a first exemplary array microscope with which the present invention may be used.

A first exemplary embodiment of an array microscope 10 is shown in FIG. 1. The array microscope comprises a plurality of individual microscope elements 12 disposed in a rectangular array. Each microscope element 12 may comprise a number of optical elements 14, 16 and 18, and a detector 20. The optical elements are typically mounted on a vertical support 22. In this example, each microscope element 12 is a three-element microscope. However, an array of simple, single-lens microscope elements or more complex microscope elements can also be used with the present invention. The array microscope 10 is typically provided with an electronic detector interface 24 for connecting the microscope to a computer 26 which stores, and may process, the image data produced by the individual detectors 20. An object is placed on a carriage 28 which is moved beneath the array microscope 10 so as to be scanned by the array. The array would typically be equipped with a linear motor 30 for moving the microscope elements axially to achieve focus.

Figure 2:
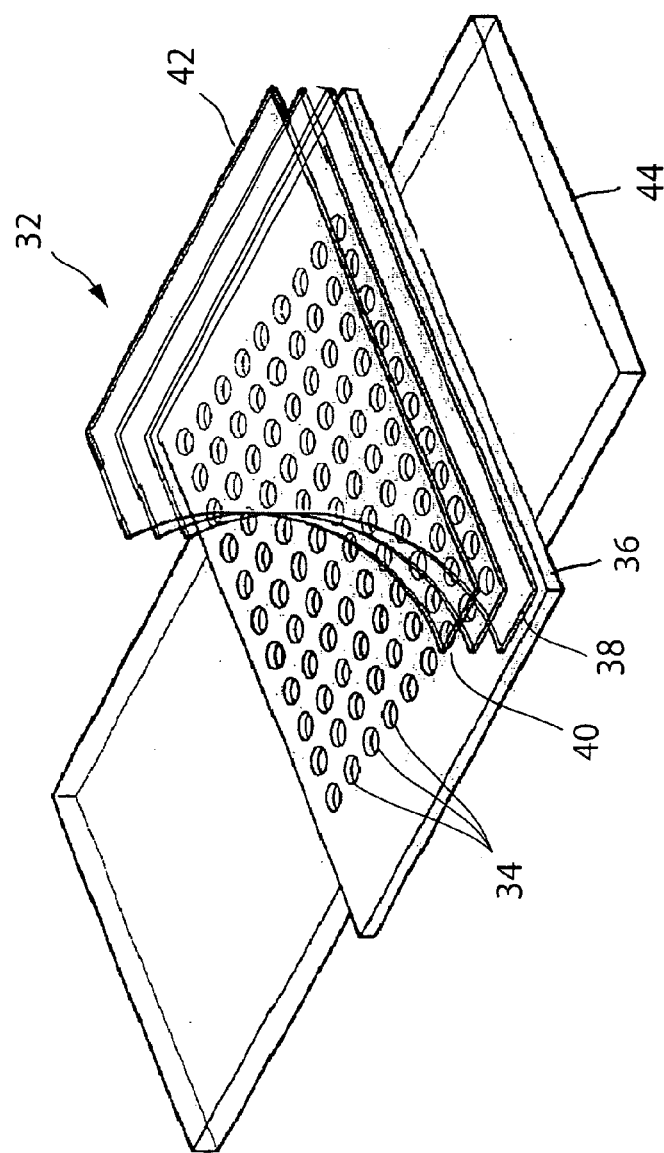
FIG. 2 is a perspective view of a second exemplary array microscope with which the present invention may be used.

A second exemplary embodiment of an array microscope 32 is shown in FIG. 2. In this case, pluralities of lenses 34 corresponding to individual microscope elements are disposed on respective lens plates 36, 38 and 40, which are stacked along the optical axes of the microscope elements. An array of detectors 42 resides above the last lens plate. As in the case of the first exemplary array microscope 10, this second array microscope 32 is employed to scan a sample on a carriage 44 as the carriage is moved with respect to the array or vice versa.

In both cases the detectors of the array 42 are actually linear arrays of detector elements distributed in a direction perpendicular to the scan direction. As the microscope elements produce respective images that are ordinarily larger than that section of an object in their fields of view, the microscope elements must be staggered laterally with respect to the scan direction and distributed longitudinally in the scan direction to capture a microscopic image of a lateral strip of the entire object.

It is to be recognized that, while the invention is described and explained hereafter with respect to the array microscope embodiments of FIG. 1 and FIG. 2, other array microscope configurations may employ the illumination systems described herein without departing from the principles of the invention.

Figure 3:
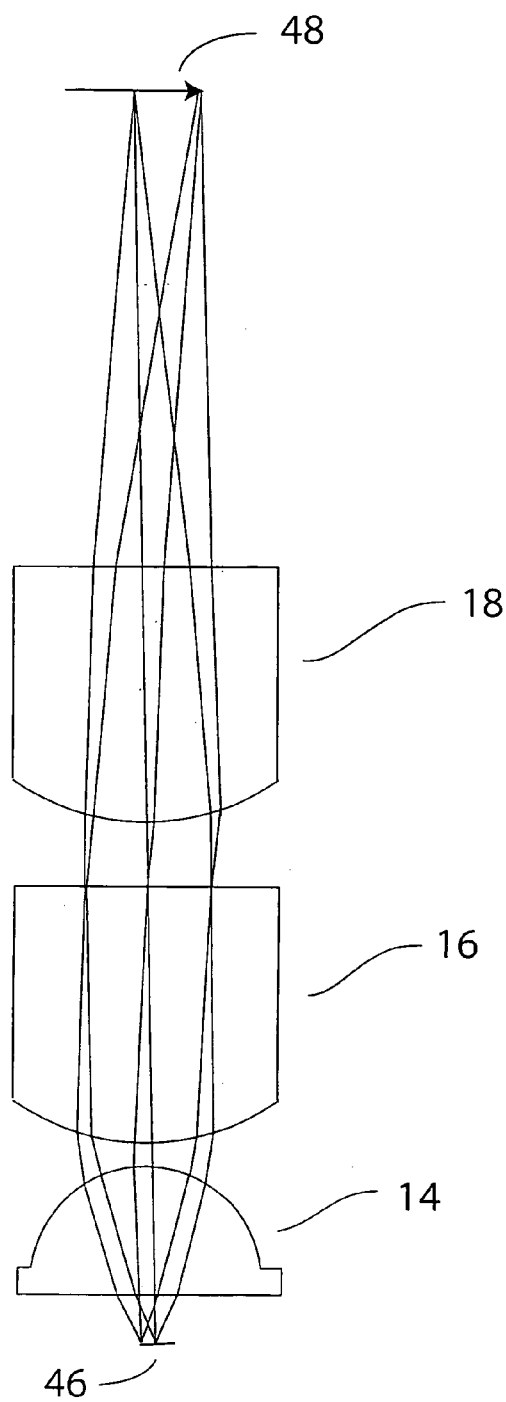
FIG. 3 is a side section and ray trace diagram for a microscope element of the array microscope of FIGS. 1 and 2.

FIG. 3 is a side section and ray trace diagram of an exemplary microscope element of the array microscopes depicted in FIGS. 1 and 2. A first lens 14 collects light from an object 46, and propagates that light through lenses 16 and 18 to form an image 48 on a detector in an array of detector elements.

The remainder of this description is directed to various epi-illumination systems and methods for illuminating a specimen to be imaged by an array microscope.

2. Kohler Illumination

Figure 4:
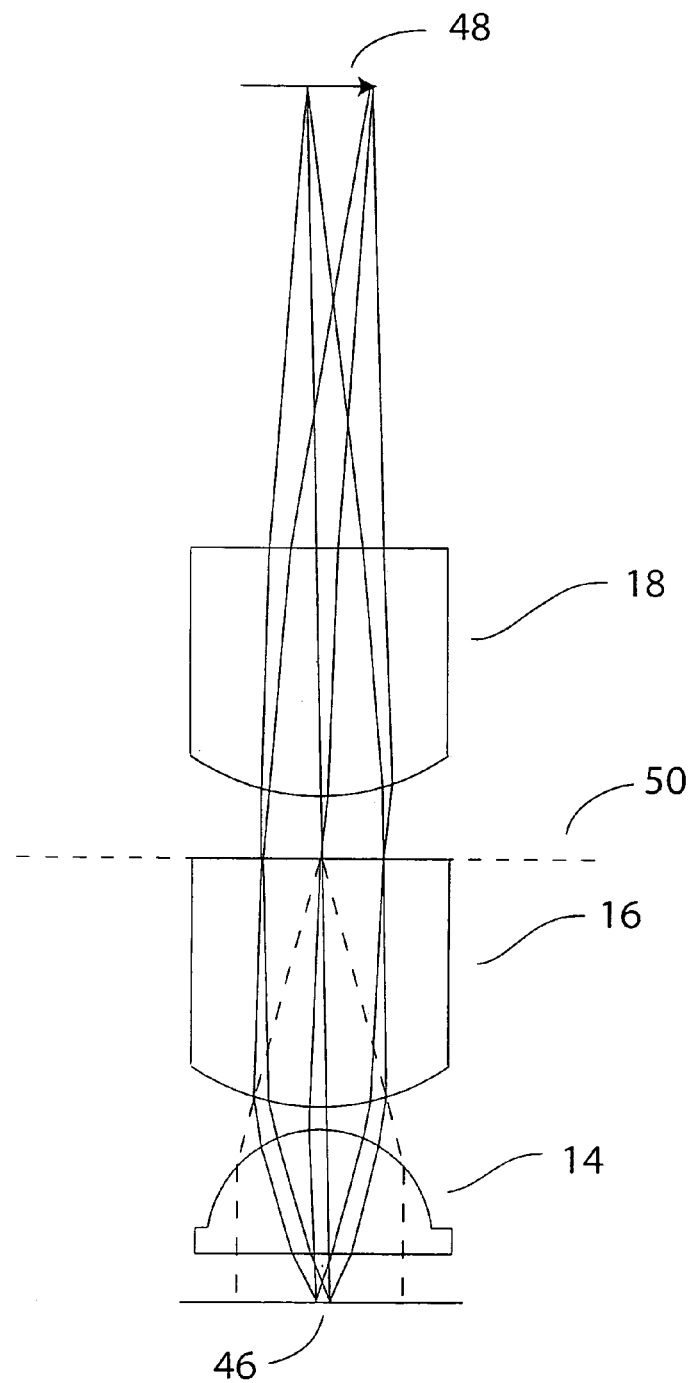
FIG. 4 is a side section and ray trace diagram for a microscope element of an array microscope illustrating Kohler illumination.

In Kohler illumination a light source is imaged into the pupil of the imaging system. Often the pupil is positioned in the focal plane of the first two lenses 14 and 16 to provide a telecentric imaging system. Thus, as shown in FIG. 4, the light source is placed, actually or virtually, on the optical axis at plane 50, which is also the focal plane of first lens 14 and the system pupil. Consequently, the source light is evenly distributed over the object 46. The problem addressed by the present invention is how to provide such source light in an array microscope.

Figure 5:
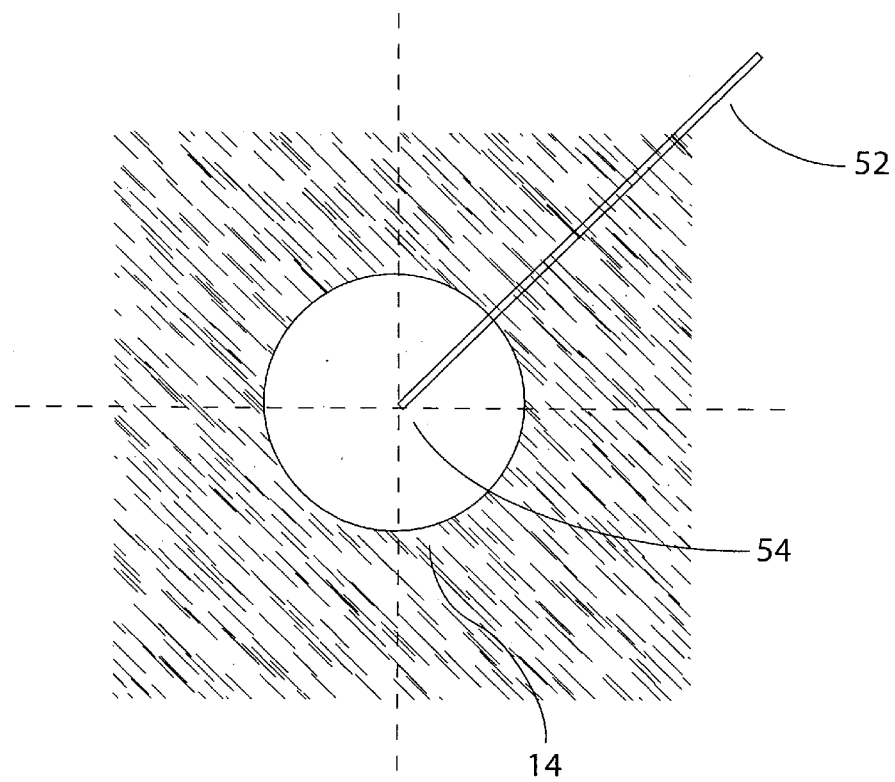
FIG. 5 is an axial view of a microscope element objective of an array microscope wherein a light source is provided according to a first embodiment of the present invention.
Figure 6:
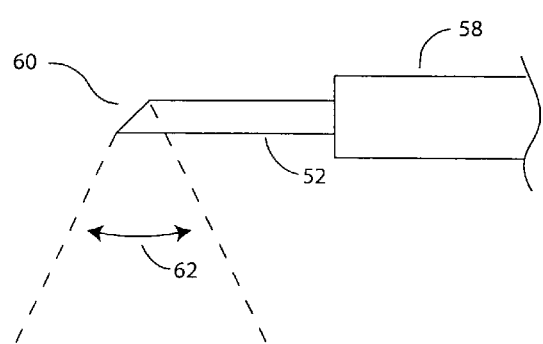
FIG. 6 is a side view of an optical fiber for providing a light source at the optical axis of a microscope element of an array microscope according to the present invention.

Turning to FIG. 5, a first embodiment of Kohler illumination employs an optical fiber 52 whose exit port 54 is placed substantially on the optical axis of the imaging system and in the plane of the system pupil, that is, the focal plane of first lens 14, so as to emit light toward the object. FIG. 6 shows a side view of the optical fiber 52. The protective cladding 58 of the fiber is stripped back and the tip 60 of the fiber is shaped so that light propagating down the fiber is reflected laterally when it reaches the tip, forming a cone of light 62 within the back side field view of the objective 14. The fiber obscures an insignificant portion of the pupil and does not alter the imaging properties of the optical system.

Figure 7:
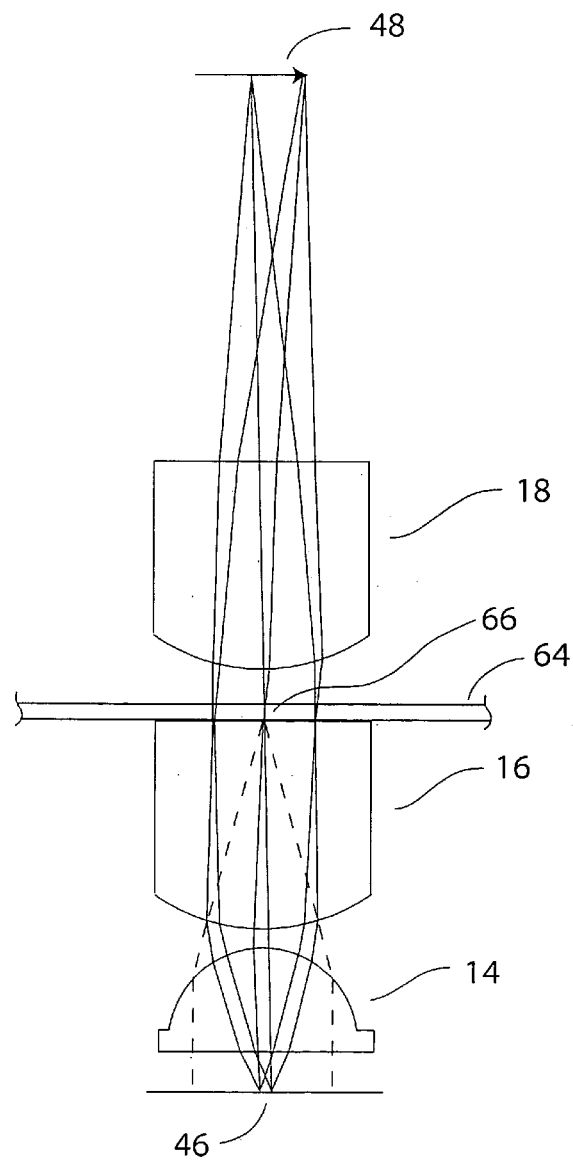
FIG. 7 is a side section and ray trace diagram for a microscope element of an array microscope wherein a light source is provided according to a second embodiment of the present invention.

FIG. 7 shows another embodiment of Kohler illumination that is particularly well suited to an array microscope of the type shown in FIG. 2. Thus, in a system having a number of optical elements 14, 16 and 18 for imaging a portion of an object 46 to a detector 42, a light guide plate 64 is disposed between a second lens 38 and a third lens 64 in the pupil of the imaging system. The second lens 38, the third lens 64 and a first lens 36 are each one of a plurality of lenses disposed in respective lens plates of an array microscope as shown, for example, in FIG. 2. The light guide exit port directs the light towards the object. The light guide exit port may be formed by a partially-reflecting boundary or other appropriate discontinuity in the light guide. Thus, for example, the light guide may be a sheet of transparent material having multiple sections disposed edge-to-edge with partially reflective surfaces at the edges. As in the previous embodiment the light source elements obscure only an insignificant portion of the pupils of the array microscope and do not alter imaging properties of the optical system.

In Kohler illumination, structured illumination can be achieved if a plurality of mutually coherent light sources is used for a microscope element. The projected interference pattern modifies the irradiance distribution at the object plane.

3. Critical Illumination

Another type of illumination that may be used for epi-illumination is critical illumination. In critical illumination the light source is imaged into the object plane.

Figure 8:
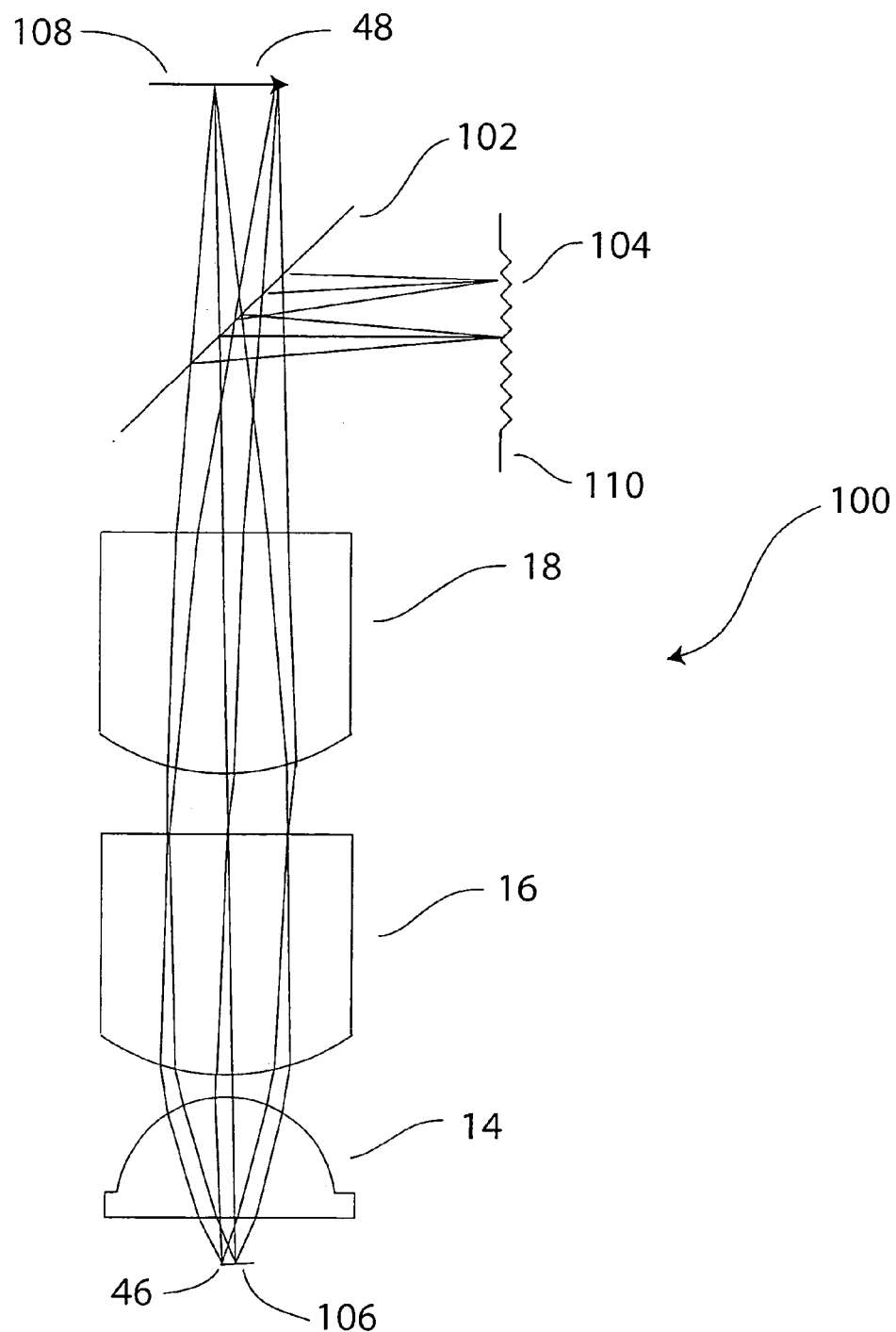
FIG. 8 is a side section and ray trace diagram for a microscope element of an array microscope illustrating a type of critical illumination.

The ray trace diagram of FIG. 8 illustrates a general embodiment 100 of the invention for critical illumination. In an individual microscope element as show in FIG. 3, a beam splitter 102 is placed in the optical path of the individual microscope element so as to reflect light from a source 104 toward the object plane 106. The beam splitter and source are disposed between the lens 18 and an image plane 108. The source 104 is an extended source unless the microscope is used in a confocal mode. In any case, the source is placed at a virtual image plane 110 produced by the beam splitter 102 so that the extended source is imaged into the object plane 106 so as to produce critical illumination. A point source can be substituted for the extended source if the microscope is used in a confocal mode.

Figure 9A:
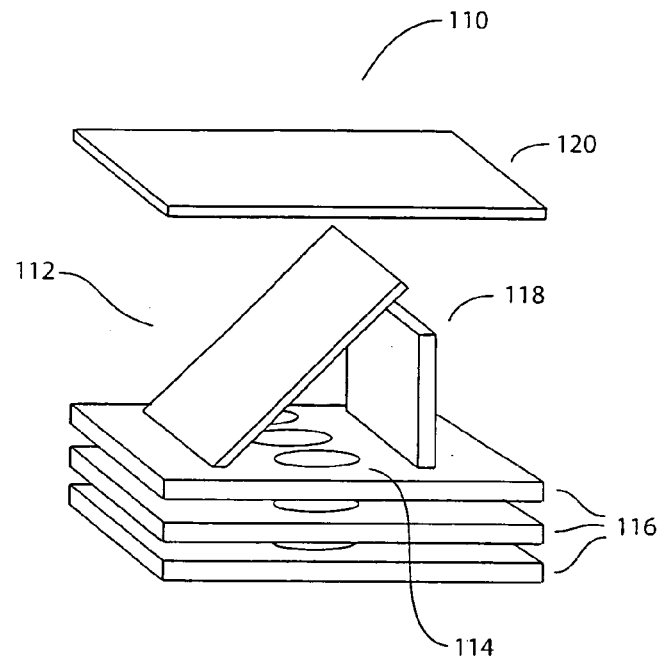
FIG. 9(a) is a perspective view of a third embodiment of the invention wherein an array microscope employs a single beamsplitter to provide critical illumination for a plurality of microscope elements.
Figure 9B:
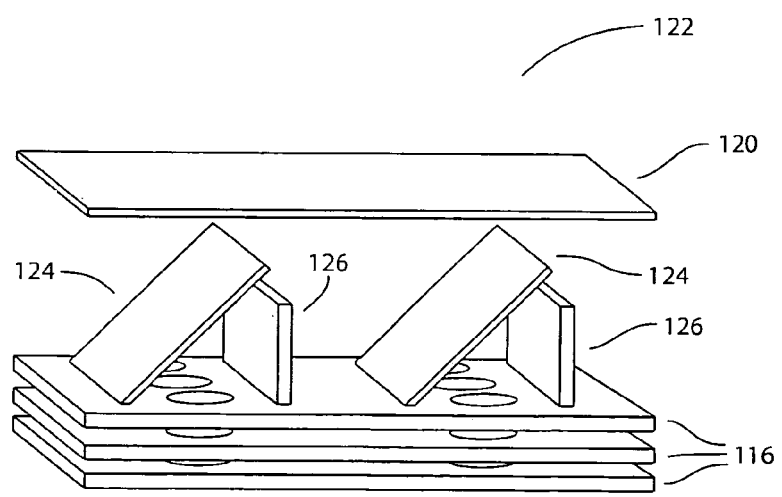
FIG. 9(b) is a perspective view of a fourth embodiment of the invention wherein an array microscope employs a plurality of beamsplitters to provide critical illumination for respective sets of microscopic elements.

A first variation 110 of critical illumination in accordance with the general embodiment 100 can be implemented as shown in FIG. 9(a) by a single beam splitter 112 that interacts with a plurality of sets of microscope elements 114, the microscope elements being comprised of a stack 116 of plates, as shown by FIG. 2 and previously discussed. An extended source 118 corresponding to the microscopes encompassed by the beam splitter 112 is located at the virtual image plane 100, the light emitted from a sample being focused on detectors 120 in the real image plane 108. Alternatively, as shown by a second variation 122 of critical illumination in FIG. 9(b), individual beam splitters 124 and corresponding extended sources 126 can be provided for individual microscope elements or rows of microscope elements. This permits the length of the array microscope to be shorter. In both cases the sources could be replaced with an array of point sources if the array microscope is used in a confocal mode.

While the illumination systems of embodiments 100, 110 and 122 are particularly suitable for critical illumination, the same physical configuration employing one or more beam-splitters may also be used for Kohler illumination by locating the source so as to image the source into the pupil of the imaging system.

4. Dark-Field Illumination

Figure 10:
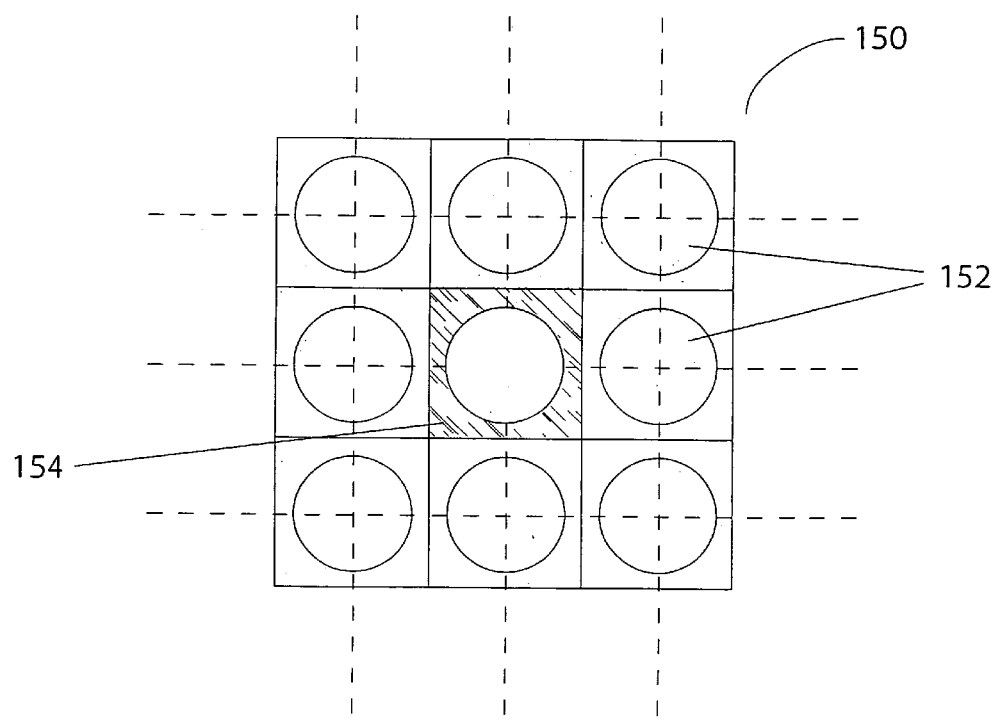
FIG. 10 is a front view of a typical array microscope.
Figure 11:
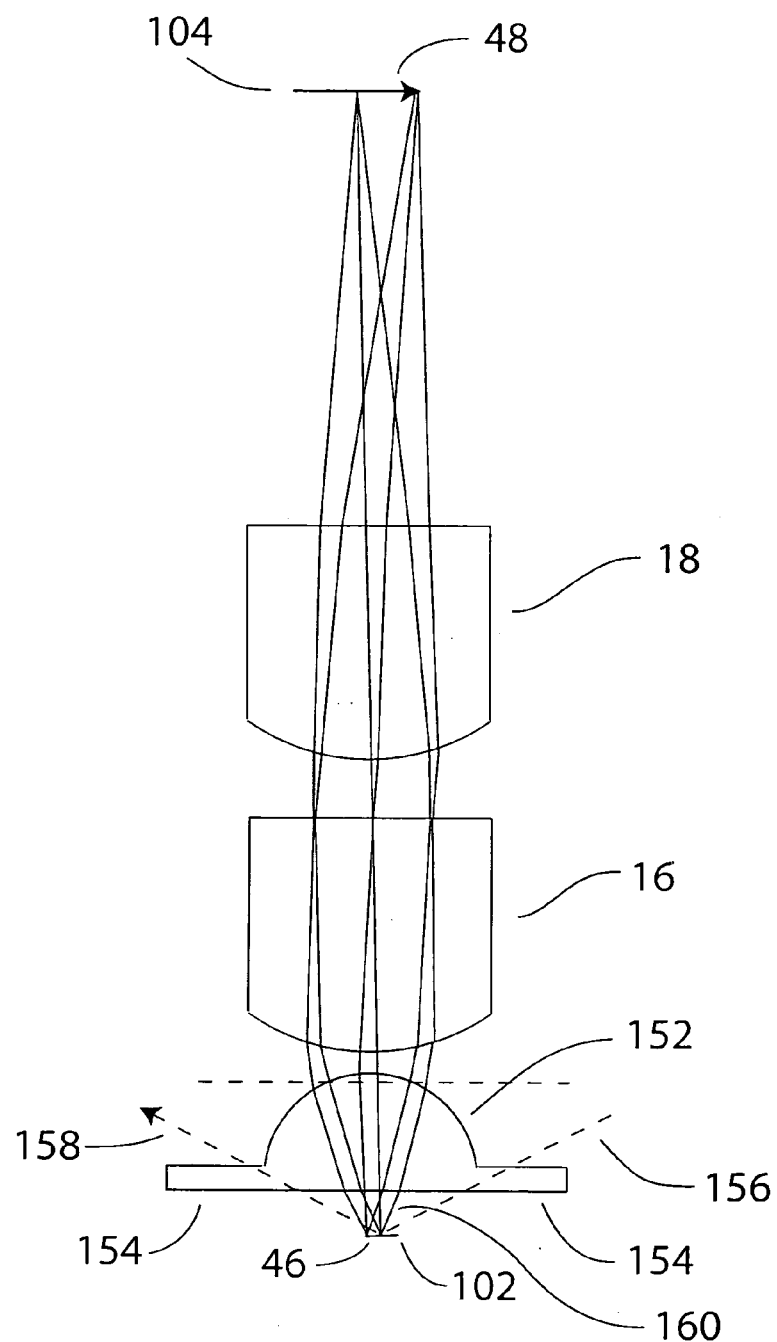
FIG. 11 is a side section and ray trace diagram for a microscope element of an array microscope illustrating dark-field illumination.

A front view of a typical array microscope 150 is shown in FIG. 10. This could be an array microscope 10 as shown in FIG. 1, an array microscope 32 as shown in FIG. 2, or some other array microscope configuration. In any case, it comprises a plurality of first lenses 152 arranged in a rectangular array and having space 154 around the periphery thereof separating one first lens from another. It has been found that this peripheral space 154 can be utilized as an illumination optical element, particularly for dark-field illumination. Thus, as shown in FIG. 11, light, represented by ray 156, directed toward the object plane 106 from peripheral space 154 reflects specularly outside the field of view of the first imaging lens 152 as shown by ray 158. In the absence of an object, no light will be collected by the first imaging lens. In the presence of an object 46, light which is scattered from the object, as represented by ray 160, will be collected by the lens and propagated to the image plane 104.

Figure 12:
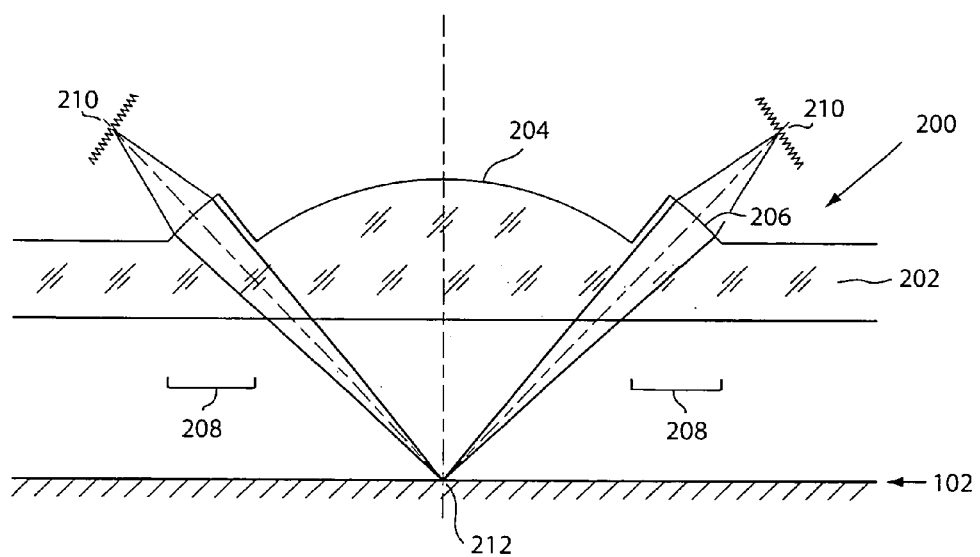
FIG. 12 is a side section of an imaging lens and corresponding refractive illumination element of a fifth embodiment of the invention.

Turning to FIG. 12, a first, refractive embodiment 200 of dark-field illumination employs a first lens plate 202 which has, for each microscope element, in addition to a first lens 204 a refractive surface 206 in the peripheral space 208 around the first lens 204. One or more light sources 210 are disposed on the back side of the first lens plate 202 and illuminate points 212 on the object plane 102. Thus, all of the light from sources 210 captured by the field of view of the refractive surface 206 illuminates the object points 212, but at an angle such that the objective 204 will only collect light which has been scattered from that object point. In general, the sources 210 are extended sources that illuminate the entire field of view of the lens 204, but point sources can be used as well.

Figure 13:
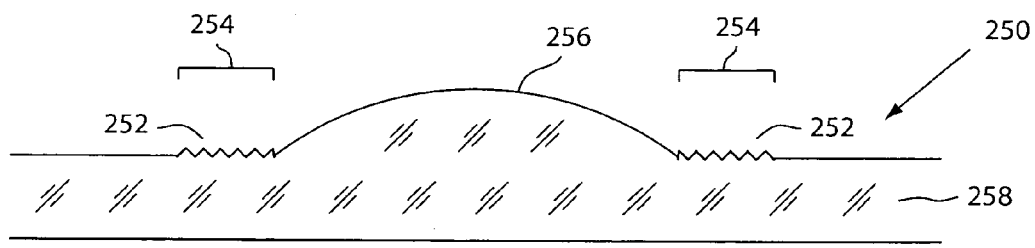
FIG. 13 is a side section of an imaging lens and corresponding diffractive illumination element of a sixth embodiment of the invention.

A second embodiment of dark field illumination 250 is shown in FIG. 13. It is a variation on the first embodiment shown in FIG. 12, in that, instead of a refractive surface in the peripheral space around the objective, it employs a diffractive element 252 in the peripheral space 254 surrounding the objective 256 on an objective plate 258. Light emitted from one or more sources is directed by the diffractive element to one or more points on the object plane for dark field illumination, as was described with respect to the embodiment of FIG. 12.

Figure 14:
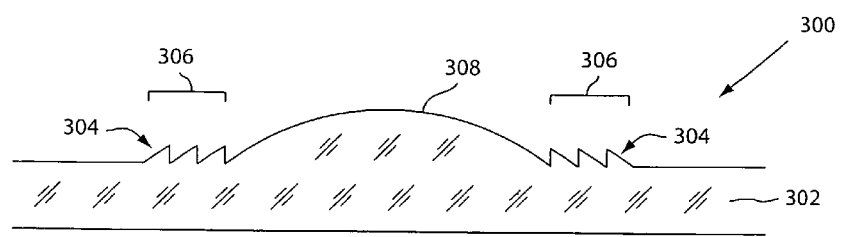
FIG. 14 is a side section of an imaging lens and corresponding Fresnel illumination element of a seventh embodiment of the invention.

The use of a Fresnel lens element is shown, for example, in a third embodiment of dark field illumination 300 shown in FIG. 14. In this case, a first imaging lens plate 302 is provided with a Fresnel lens element 304 in the peripheral space 306 surrounding a first imaging lens 308. As described with respect to FIG. 12, light from sources disposed on the back side of the first lens plate 302 is directed through the Fresnel lens 304 toward the object plane at an angle so as to provide dark field illumination.

Figure 15:
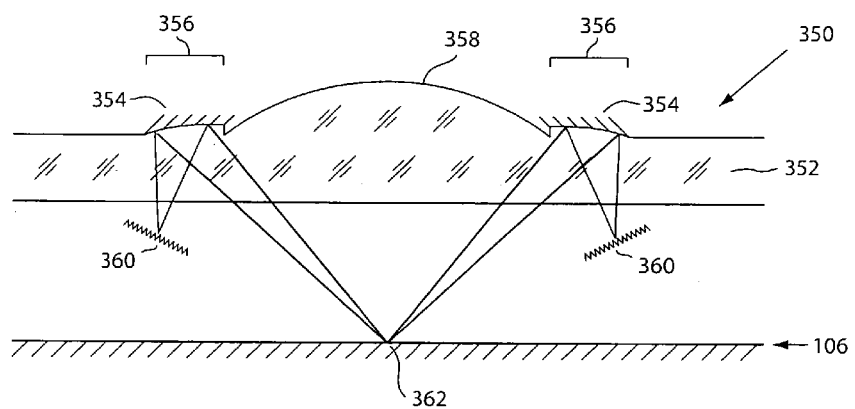
FIG. 15 is a side section of an imaging lens and corresponding reflective illumination element of an eighth embodiment of the invention.

In some instances it may be desirable to place light sources on the front side of the first lens of a multi-element array microscope of the type shown, for example, in FIG. 2. In a fourth embodiment of dark field illumination 350 shown in FIG. 15, a first lens plate 352 is provided with reflective surfaces 354 in the peripheral space 356 surrounding first lens 358. Thus, light sources 360 disposed on the front side of the objective plate reflect light off the reflective surfaces 354 to points 362 on the object plane 106 imaged to a conjugate point on the image plane. As previously explained the light sources may be extended or point sources depending on the microscope mode.

Figure 16:
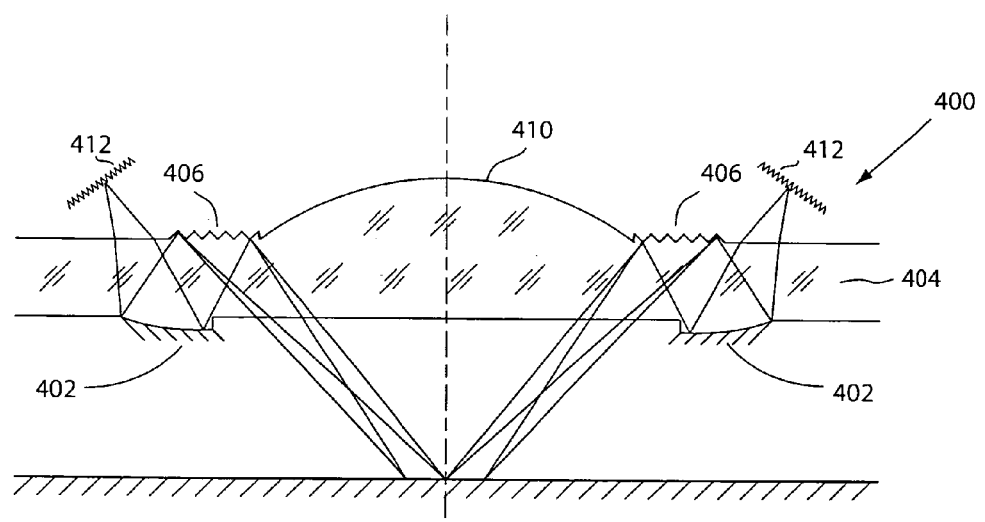
FIG. 16 is a side section of an imaging lens and corresponding combined reflective and diffractive illumination elements of a ninth embodiment of the invention.

A combination of a diffractive optical element and a reflective optical element is shown in FIG. 16. In this case, a reflective surface 402 is disposed on the front side of a first lens plate 404 and a reflective, diffractive element is disposed on the back side of the plate 404 in the peripheral space 408 surrounding a first lens plate 410. Light sources 412 which may be extended or point sources, are disposed on the back side of the first lens plate so as to direct light toward the reflective surfaces 402, which reflect light to the diffractive element 406. The advantage of this embodiment is that the reflective and diffractive element combination provides illumination having a spatially varying spectrum in a radial direction.

5. Confocal Microscopy

Figure 17:
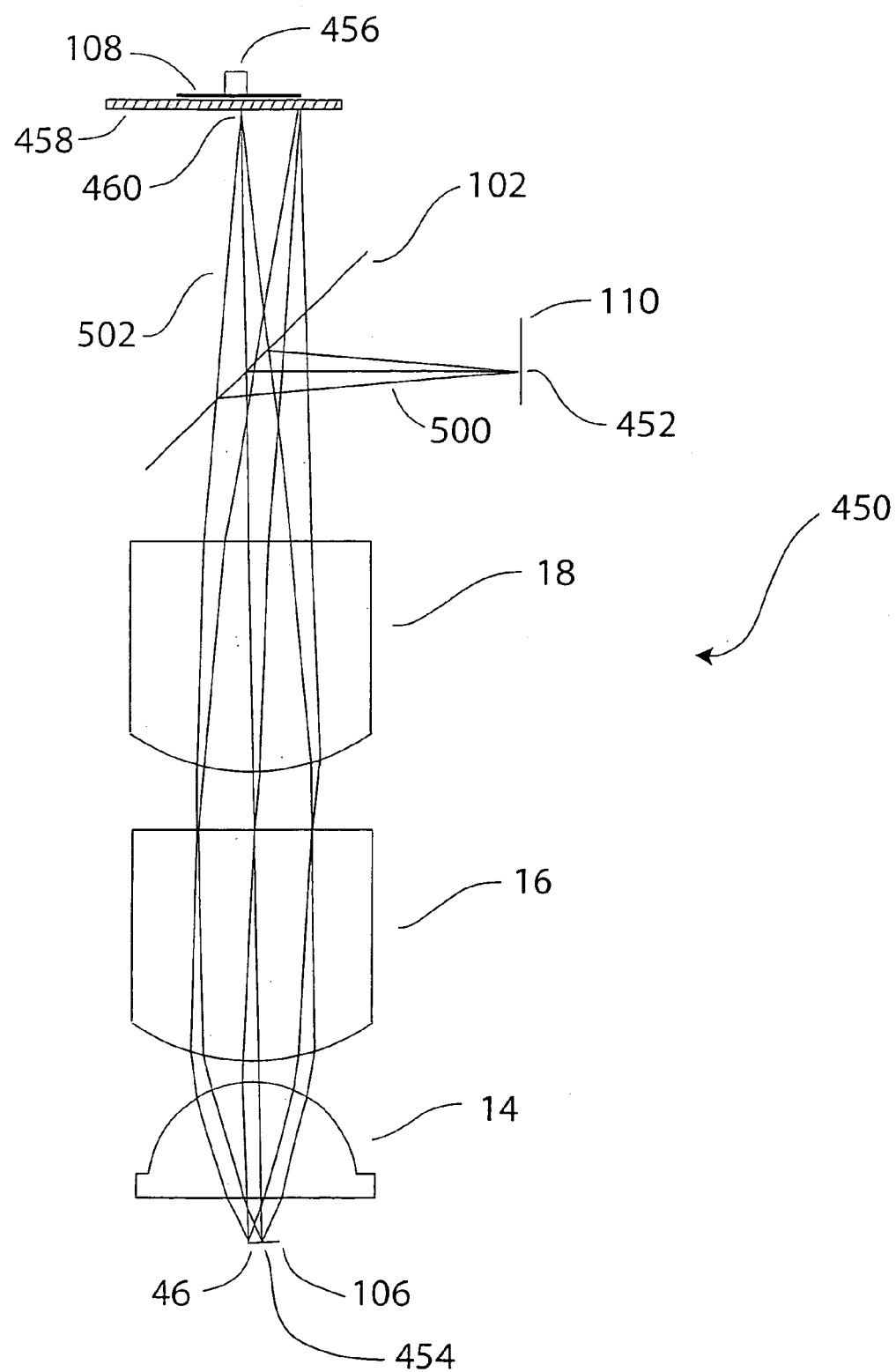
FIG. 17 is a side section and ray trace diagram for a microscope element of an array confocal microscope employing critical illumination according to a tenth embodiment of the present invention.

The illumination systems of the present invention, particularly the critical illumination systems, can also be used in a confocal array microscope, as shown, for example, by array microscope element 450 in FIG. 17. In a confocal microscope the object points are imaged to their conjugate image points one-by-one, while the microscope scans the object to be imaged. In an exemplary individual microscope element, a beamsplitter 102 is placed in the optical path of the individual microscope element so as to reflect light from a point source 452 at a virtual image plane 110 toward the object plane 106. Light emitted from a point 454 on the object plane 106 illuminated by the point source 452 is then propagated back through the first lens 14, second lens 16 and third lens 18 to a single detector 456. A stop 458 with a pinhole aperture 460 therein ideally prevents all but the diffraction-limited light from point 454 from reaching the detector 456. The specimen to be examined is then moved relative to the microscope element to scan all of the points thereon within the resolution capabilities of the optics while the detector produces data representative of the light intensity as a function of position on the specimen. Alternatively, the specimen can remain stationary and the array microscope is moved to scan all of the points, or both the specimen and the array microscope can remain stationary and the object is scanned by scanning the illuminating and imaging light beams simultaneously using scan mirrors or other beam scanning mechanisms as are known in the art. That data is used to reproduce a microscopic surface profile of the specimen.

6. Epi-Fluorescence Microscopy

Any of Kohler, critical and dark field illumination, and confocal microscopy, in an array microscope as described above can be used in epi-fluorescence microscopy. In epi-fluorescence microscopy the light that is imaged is fluorescent light, not reflected light. Ordinarily, the object is illuminated at one wavelength, or energy spectrum, and the fluorescent light is emitted at another wavelength, or in an at least partially different energy spectrum. Typically, the illumination light source emits in the ultraviolet wavelengths, and the fluorescent light is at different, typically longer, wavelengths. While not limited to confocal microscopy, epi-fluorescence microscopy is often used with confocal microscopy.

Epi-fluorescence microscopy used in accordance with the present invention can be understood in the context of the confocal array microscope embodiment of FIG. 17. In the case of epi-fluorescence microscopy, the light 500 that is emitted from the source 454 is at a different wavelength, typically an ultra-violet wavelength, that the wavelength of the light 502 that is emitted by the object and propagated to the detector 556. Likewise, in the previously described Kohler, critical and dark-field illumination embodiments, the source light is at one, predetermined wavelength and the light emitted by the object is at one or more different wavelengths when the embodiment is used in an epi-fluorescence mode.

Thus, for example, in FIG. 18, the array microscope 32 can be used in an epi-fluorescence mode to examine a corresponding microarray 558 of biological samples 560. The individual microscope elements 12 of the array microscope 32, represented in part by first lenses 34, may use any of Kohler, critical or dark-field illumination, and may be operated in a confocal mode, as explained above.

7. Structured Illumination and Interferometry

In many cases it may be desirable to illuminate an object with a particular intensity distribution or pattern. This can be accomplished by employing the peripheral space around individual elements to shape the illumination or providing multiple, mutually coherent sources in the pupil of the system. One way is to use a refractive illumination element whose optical surface is designed to produce a desired wavefront. Another way is to use coherent light as the illumination light source and a hologram as a peripheral illumination element to produce a desired interference pattern at the object.

In addition, an interferometric setup used with a coherent light illumination source can be used to produce an interferogram with the light reflected from the object and a reference surface.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims which follow.

We claim:

1. An epi-illumination system in an array microscope, comprising:
   a plurality of laterally-distributed optical imaging elements disposed with respect to a common object plane so as to produce respective images of respective sections of an object; and
   a plurality of light sources disposed substantially on respective optical axes of respective said optical imaging elements and substantially in respective exit pupils thereof on the same optical side of the object plane as the imaging elements, at least one of said light sources comprising at least two mutually coherent light source elements for producing a desired intensity distribution.

2. An epi-illumination system in an array microscope, comprising:
   a plurality of laterally-distributed optical imaging elements disposed with respect to a common object plane so as to produce respective images of respective sections of an object;
   a plurality of light sources disposed substantially on respective optical axes of respective said optical imaging elements and substantially in respective exit pupils thereof on the same optical side of the object plane as the imaging elements; and
   one or more detectors disposed at the image planes of the plurality of optical imaging elements, and wherein the respective light sources radiate light having a first energy spectrum and said detectors respond to an at least partially different energy spectrum for fluorescence imaging.

3. The epi-illumination system of claim 2, further comprising a plurality of pinhole apertures disposed at the image planes of respective optical imaging elements to limit the light propagated to the corresponding detector to light from a conjugate point at the object plane for confocal microscopy.

4. An epi-illumination system in an array microscope, comprising:
   a plurality of laterally-distributed optical imaging elements disposed with respect to a common object plane so as to produce respective images of respective sections of an object;
   a plurality of light sources disposed substantially on respective optical axes of respective said optical imaging elements and substantially in respective exit pupils thereof on the same optical side of the object plane as the imaging elements; and
   a plurality of detectors disposed at respective image planes of the optical imaging elements and a plurality of respective pinhole apertures disposed at said image planes to limit the light propagated to the corresponding detector to light from a conjugate point at the object plane for confocal microscopy.

5. An epi-illumination system in an array microscope, comprising:
   a plurality of laterally-distributed optical imaging elements disposed with respect to a common object plane so as to produce respective images of respective sections of an object;
   a plurality of light sources disposed substantially on respective optical axes of respective said optical imaging elements and substantially in respective exit pupils thereof on the same optical side of the object plane as the imaging elements, the light sources comprising a first end of an optical fiber and a source light coupled to a second end of the optical fiber for propagating light to the first end of the optical fiber.

6. The epi-illumination system of claim 5, wherein the first end of the optical fiber is formed so as to reflect light laterally from the fiber, and the fiber is disposed in the pupil so that laterally reflected light is propagated to the object plane.

7. An epi-illumination system in an array microscope, comprising:
   a plurality of laterally-distributed optical imaging elements disposed with respect to a common object plane so as to produce respective images of respective sections of an object;
   a plurality of light sources disposed substantially on respective optical axes of respective said optical imaging elements and substantially in respective exit pupils thereof on the same optical side of the object plane as the imaging elements, said light sources comprising reflective boundaries in a light guide disposed substantially in the exit pupil plane of one or more optical imaging elements and a source of light coupled to the light guide for propagating light therethrough, the boundaries being disposed substantially on the optical axes of respective optical imaging elements so as to reflect light propagating in the light guide toward the object plane.

8. A method of providing illumination in an array microscope having a plurality of optical imaging elements arranged in an array with respect to a common object plane so as to produce respective images of respective sections of an object, the method comprising:
   providing one or more illumination light sources for respective optical imaging elements;
   placing the one or more illumination light sources substantially on the respective optical axes and substantially at the pupils of respective optical imaging elements or conjugate planes thereto on the same optical side of the object plane as the imaging elements, so as to direct light toward the object plane; and
   propagating illumination light to the light sources from an off axis position.

9. A method of providing illumination in an array microscope having a plurality of optical imaging elements arranged in an array with respect to a common object plane so as to produce respective images of respective sections of an object, the method comprising:
   providing one or more illumination light sources for respective optical imaging elements;
   placing the one or more illumination light sources substantially on the respective optical axes and substantially at the pupils of respective optical imaging elements or conjugate planes thereto on the same optical side of the object plane as the imaging elements, so as to direct light toward the object plane; and
   limiting the light detected to light radiated from substantially one point on the object plane at a time, while scanning the points on the object plane.

* * * * *